(12) United States Patent
Bach et al.

(10) Patent No.: US 10,586,998 B2
(45) Date of Patent: Mar. 10, 2020

(54) PRESSING DEVICE FOR PRESSING A FUEL CELL STACK AND FUEL CELL DEVICE WITH PRESSING DEVICE

(71) Applicants: Volkswagen AG, Wolfsburg (DE); Audi AG, Ingolstadt (DE)

(72) Inventors: Peter Bach, Burnaby (CA); Sebastian Voigt, Lubeck (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 71 days.

(21) Appl. No.: 15/821,057

(22) Filed: Nov. 22, 2017

(65) Prior Publication Data

US 2018/0145366 A1    May 24, 2018

(30) Foreign Application Priority Data

Nov. 22, 2016    (DE) .................. 10 2016 122 442

(51) Int. Cl.
*H01M 8/248* (2016.01)
*H01M 8/247* (2016.01)

(52) U.S. Cl.
CPC ........... *H01M 8/248* (2013.01); *H01M 8/247* (2013.01)

(58) Field of Classification Search
CPC ........... H01M 8/04082; H01M 8/2484; H01M 8/2404; H01M 8/2475; H01M 8/2485; H01M 8/248; H01M 8/0258; H01M 8/2465; H01M 2008/1293; H01M 8/2425; Y10T 29/49108
USPC ........................................................ 429/469
See application file for complete search history.

(56) References Cited

U.S. PATENT DOCUMENTS

| 9,508,997 B2 | 11/2016 | Kaeding et al. |
| 2005/0277012 A1* | 12/2005 | Inagaki ................. H01M 8/247 429/470 |

FOREIGN PATENT DOCUMENTS

| DE | 10 2007 002 286 A1 | 7/2008 |
| DE | 10 2012 219 022 | 4/2014 |
| WO | 99/27602 A1 | 6/1999 |

* cited by examiner

*Primary Examiner* — Gary D Harris
(74) *Attorney, Agent, or Firm* — Seed Intellectual Property Law Group LLP

(57) ABSTRACT

The invention relates to a fuel cell device with a pressing device (3) for pressing a fuel cell stack of the fuel cell device, as well as a pressing device (3) for pressing the fuel cell stack. In order to be able to press the fuel cell stack as needed, the invention provides that the pressing device (3) have a pretensioning unit (9a) with an adjusting element (12) and a supporting element (13), wherein contact surfaces (15, 16) of the adjusting element (12) and of the supporting element (13) extend obliquely to the pressing direction (P).

10 Claims, 2 Drawing Sheets

Figure 1:
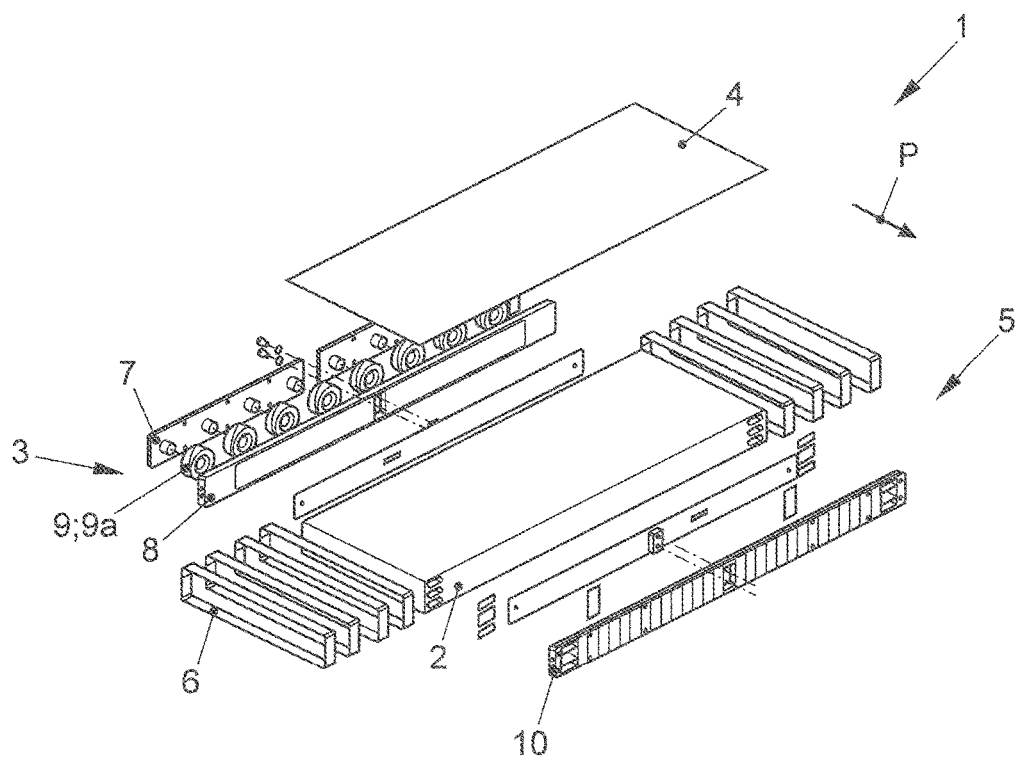

PRESSING DEVICE FOR PRESSING A FUEL CELL STACK AND FUEL CELL DEVICE WITH PRESSING DEVICE

The invention relates to a pressing device for pressing a fuel cell stack in a pressing direction, with at least one spring-elastic pressing unit for applying a spring force acting in the pressing direction, and with at least one pretensioning unit with which a pretensioning of the pressing unit can be changed. The invention further relates to a fuel cell device with a fuel cell stack and a pressing device pressing the fuel cell stack.

Pressing devices and fuel cell devices of the aforementioned type are common and known from, for example, WO 99/27602 A1.

Fuel cell devices use the chemical conversion of a fuel with oxygen in order to generate electrical energy. To this end, fuel cell devices contain as core components membrane electrode assemblies, which can respectively be designed as a combination of an ion-conducting—in particular, proton-conducting—membrane and an electrode (anode and cathode) arranged on each side of the membrane. In addition, gas diffusion layers can be arranged on both sides of the membrane electrode unit on the sides of the electrodes facing away from the membrane. The fuel cell device generally has a plurality of membrane electrode assemblies which are arranged in the stack and at least partially form the fuel cell stack, and whose electrical power outputs accumulate. During operation of the fuel cell device, the fuel—in particular, hydrogen ($H_2$) or a gas mixture containing hydrogen—is guided to the anode, where an electrochemical oxidation of the fuel with loss of electrons takes place. A water-bound or water-free transport of the protons from the anode chamber into the cathode chamber takes place via the electrolyte or the membrane, which separates the reaction chambers from each other in a gas-tight manner and electrically insulates them. The electrons provided at the anode are guided to the cathode via an electrical line. The cathode is supplied with oxygen or a gas mixture containing oxygen so that a reduction of the oxygen with gain of electrons takes place. At the same time, the oxygen anions react in the cathode chamber with the protons transported via the membrane to form water. As a result of the direct conversion of chemical to electrical energy, fuel cell devices achieve an improved efficiency compared to other electricity generators because the Carnot factor is avoided.

The pressing device is provided to be able to influence the outer dimensions of the fuel cell stack during its manufacture or during operation, for example, and/or to press the individual fuel cells evenly. The pretensioning unit of the pressing device allows for an adaptation of the pretensioning of the spring-elastic pressing unit so that the spring-elastic pressing forces acting on the fuel cells can be changed, and the fuel cells can thus be pressed more or less.

The known pressing devices use screws and nuts in order to change the pretensioning. Screws and nuts are, however, cumbersome to operate.

The invention is therefore based upon the aim of providing a pressing device for pressing a fuel cell stack, as well as a fuel cell device with a fuel cell stack and with a pressing device pressing the fuel cell stack, wherein the pressing force acting on the fuel cell stack can be changed easily.

For the aforementioned pressing device, the aim is achieved by the pretensioning unit having an adjusting element and a supporting element, wherein the adjusting element can be turned relative to the supporting element in an adjusting direction extending around the pressing direction and wherein the adjusting element and the supporting element have contact surfaces which contact each other and extend in parallel to each other and obliquely to the pressing direction. For the aforementioned fuel cell device, the aim is achieved by the pressing device being the pressing device according to the invention.

As a result of the pretensioning unit having the adjusting element and the supporting element, wherein these elements contact each other at the contact surfaces extending obliquely to the pressing direction and can be turned relative to each other around the pressing direction, the height of the pretensioning unit along the pressing direction can be changed easily by turning, and the pretensioning of the spring-elastic pressing unit can thus be changed readily.

The solution according to the invention may be further improved by various embodiments that are each advantageous per se and, unless stated otherwise, may be combined with each other in any desired manner. These embodiments and their associated advantages are discussed below.

The contact surfaces can thus monotonously rise or fall, at least in sections, in the adjusting direction, so that a turning in a direction results in an increase or in a decrease of the pretensioning. The contact surfaces can therefore be termed oppositely extending contact ramps. If the contact surfaces extend linearly, for example, the pretensioning is evenly changed with the turning. If the slope of the contact surfaces changes and increases or decreases, the pretensioning can be changed more easily—especially when high spring forces are already active. Alternatively, the pretensioning can be changed quickly, precisely when small spring forces are active.

The contact surfaces can be formed, at least in sections, along a helix extending around the pressing direction, so that the supporting and adjusting elements can be turned at most up to 360° relative to each other in order to change the pretensioning. The length of the contact surfaces can thus at most correspond to the length or a fraction of the length of a winding of the helix. The length or extent of the contact surfaces around the pressing direction can be limited to at most 360°, 270°, 180°, 90°, or to values located between these values. A single turning of the adjusting element up to the respective angle can thus change the pretensioning from the minimum to the maximum, or vice versa.

So that the pretensioning can be adjusted permanently without the supporting and adjusting elements having to be held in position relative to each other manually, the contact surface of the supporting element can have at least one locking element, and the contact surface of the adjusting element can have at least one counter-locking element for the locking element. The locking element and the counter-locking element can be designed to block a movement of the adjusting element in the adjusting direction or in the opposite direction. The locking element and the counter-locking element can be formed to be complementary to each other. For example, the at least one locking element can be wedge-shaped or sawtooth-shaped, and the counter-locking element can be designed to be complementary to the locking element. As a result of the mechanical interlocking of the locking element and the counter-locking element, the supporting element and the adjusting element can engage with each other in a predefined turning position so that an undesired leaving of the predefined turning position in the adjusting direction or in the opposite direction is prevented. The locking element and the counter-locking element furthermore make it possible for an operator of the pretensioning unit to perceive the engagement haptically and thus easily adjust the pretensioning.

The contact surface of the supporting element can have a plurality of locking elements, and the contact surface of the adjusting element can have a plurality of counter-locking elements. For example, the contact surfaces can be provided completely with locking elements or counter-locking elements, at least along the adjusting direction.

The supporting element and the adjusting element can respectively have at least two contact surfaces designed to be substantially complementary to each other. In the adjusting direction, the contact surfaces of the supporting element or the contact surfaces of the adjusting element can be arranged one after the other, i.e., follow each other in the adjusting direction. The contact surfaces arranged one after the other in the adjusting direction are, possibly, not arranged one after the other transversely to the adjusting direction, i.e., in the pressing direction.

The at least two contact surfaces of the supporting element or of the adjusting element can, in a graphical development of a lateral view of the supporting element or of the adjusting element, extend at an angle of less than 180° or in parallel to each other. If the at least two contact surfaces extend at an angle of less than 180° to each other, a turning in the adjusting direction can initially bring about an increase in the pretensioning. If the turning position is changed further in the adjusting direction, so that the following contact surfaces of the supporting element and the adjusting element now come into contact with each other, the pretensioning can be reduced. If the developed illustrations of the at least two contact surfaces of the supporting element or of the adjusting element extend in parallel to each other, however, it is possible that, precisely in case of large turns in the adjusting direction of up to 180°, the interacting contact surfaces of the supporting element and of the adjusting element prevent a tilting of the supporting element in relation to the adjusting element or vice versa. The interacting contact surfaces can, in this case, flank an axis of rotation of the pretensioning unit in order to improve the mechanical stability of the pretensioning unit, even in case of angles of rotation of up to 180°.

The pressing unit can have a contact wall for transferring a pressing force generated by the pressing unit to the fuel cell stack, and an outer wall. At least the adjusting element, the pretensioning unit, and/or the pressing unit can be arranged between the contact wall and the outer wall. The outer wall can have at least one opening, through which the adjusting element is accessible. Even in the assembled state of the pressing device, in which the pressing device can press the fuel cell stack, the pretensioning, and thus the currently active pressing force, can easily be changed due to the easy accessibility of the adjustment element. An adjusting section of the adjusting element can, in this case, be designed such that the adjusting section can be turned by means of a tool and, for example, by means of a screw wrench or a socket.

The adjusting element or the supporting element can be attached to the contact wall. The adjusting element can preferably be attached to the contact wall so that the adjusting element can be turned relative to the supporting element and to the contact wall. The supporting element can, in particular, be designed to be integral with the contact wall, whereby the assembly of the pressing device is simplified.

The adjusting element can have at least one holding element contacting the pressing unit and possibly protruding into it. The holding element can prevent a lateral sliding or tilting of the adjusting element transverse to the pressing direction, e.g., if the pressing unit has a counter-holding element. The pressing unit can, for example, have a central opening of a spring element, such as a disk spring, a disk spring stack, or a helical spring, wherein the counter-holding element is an inner surface of the central opening facing the holding element. Alternatively or additionally, the spring element can have an outer surface which has the counter-holding element and which the holding element abuts.

In order to ensure the ability to turn evenly and security against sliding or tilting in all directions transverse to the pressing direction, the pressing unit can provide a pivot bearing for the adjusting element. The counter-holding element can, for example, be formed along a jacket of a circular cylinder, the longitudinal axis of which extends in parallel to the pressing direction. The holding element can further be designed [as] a collar with a circular cross-section and a longitudinal axis extending in parallel to the pressing direction.

If the pressing unit has the spring element, such as a disk spring stack, a helical spring, or a spring with another shape, the length of the collar parallel to its longitudinal axis, i.e., in the pressing direction, can be less than the height of the spring element in the pressing direction, so that a mechanical collision of the collar with the outer wall is prevented, even if the disk spring stack is highly compressed.

The slope of the contact surfaces can be dimensioned such that the holding element continues to be spaced apart from the outer wall or to abut the outer wall when the adjusting element is turned as much as possible. This can prevent a collision of the holding element with the outer wall or a pretensioning that is too high.

The pressing unit can have a guiding element abutting the adjusting element and the supporting element. The guiding element can be arranged in a cavity possibly located in the adjusting element and/or the supporting element and abut an inner surface of the adjusting element and/or the supporting element extending in parallel to the pressing direction and along the adjusting direction. The guiding element can be designed to guide the relative movement of the adjusting element in relation to the supporting element and/or the translation resulting from the turning of the adjusting element along the pressing direction. The guiding element is, for example, formed cylindrically or annularly and has, for example, a circular cross-section.

Alternatively or additionally, an external guiding element can be provided, which is designed to guide the relative movement of the adjusting element to the supporting element, and/or the translation resulting from the turning of the adjusting element, along the pressing direction. The guiding element can externally abut outer surfaces of the adjusting element and/or the supporting element extending in parallel to the pressing direction and in the adjusting direction. The guiding element can, for example, be designed to be toroidal or annular.

If the guiding element is designed to be toroidal or annular, its central longitudinal axis can extend in parallel to the pressing direction.

Figure 2:
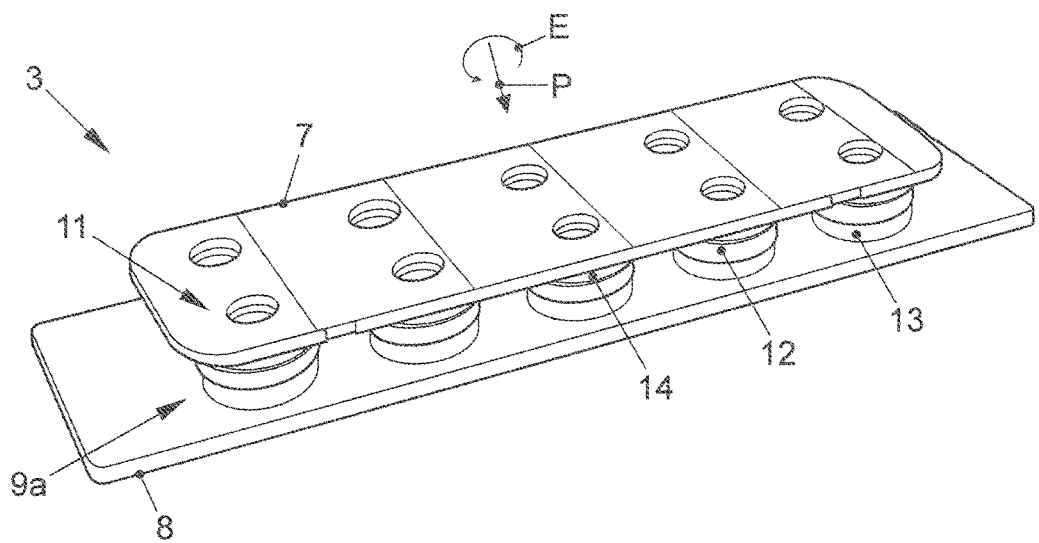
Figure 3:
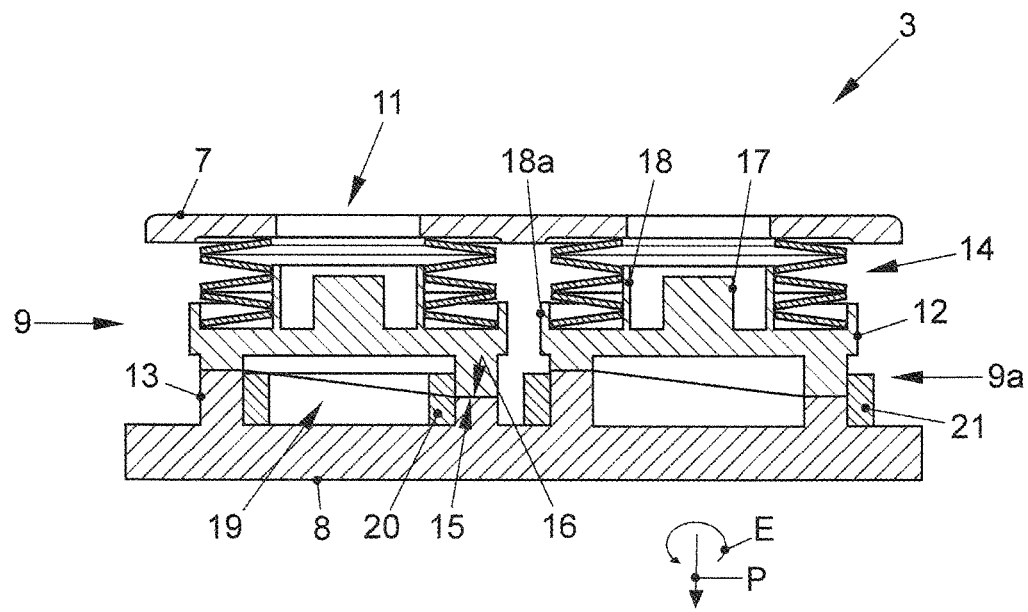
Figure 4:
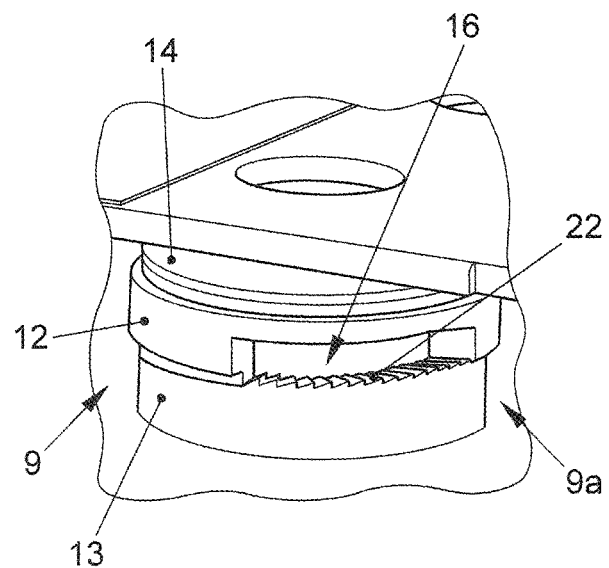

The invention is explained below in exemplary embodiments on the basis of the respective drawings. The following is shown:

FIG. 1 a schematic exploded view of an exemplary embodiment of the fuel cell device according to the invention, FIG. 2 a schematic perspective view of another exemplary embodiment of the pressing device according to the invention, FIG. 3 a schematic sectional view of the exemplary embodiment of FIG. 2, and FIG. 4 a schematic perspectival view of another exemplary embodiment of the pressing device according to the invention, with a cutaway section.

The invention is hereinafter explained using exemplary embodiments, with reference to the drawings. The different features of the embodiments can be combined independently of each other, as was already explained for the individual advantageous embodiments, unless otherwise stated in individual cases.

First, the structure and function of a fuel cell device according to the invention are described with reference to the exemplary embodiment in FIG. 1.

FIG. 1 shows an exemplary embodiment of the fuel cell device 1 according to the invention with a fuel cell stack 2 and with an exemplary embodiment of the pressing device 3 according to the invention. The fuel cell device 1 is furthermore shown with a housing lid 4. A housing bottom of the fuel cell device 1 is, however, not shown, for the sake of clarity. The housing lid 4 and the housing bottom (not shown) of the fuel cell device 1 can connect the pressing device 3 to a counter-pressing unit 5 in a force-transmitting manner. The fuel cell stack 2 is arranged between the pressing device 3 and the counter-pressing device 5. In FIG. 1, the fuel cell device 1 is furthermore illustrated with several optional shape-retaining elements 6, which can at least limit or even prevent an undesired deformation of the fuel cell stack 2.

The pressing device 3 is shown with an outer wall 7 and a contact wall 8, wherein several spring-elastic pressing units 9 are arranged between the outer wall 7 and the contact wall 8. The pressing units 9 are designed to exert a pressing force acting in a pressing direction P on the contact wall 8 and, from there, on the fuel cell stack 2. The optionally provided contact wall 8 distributes the pressing force of the individual pressing units 9 evenly onto the side of the fuel cell stack 2 facing the pressing units 9.

It may suffice to provide only one pressing unit 9 in order to press the fuel cell stack 2 in parallel to the pressing direction P. If various sections of the fuel cell stack 2 are, however, to be pressed differently, it may be advantageous to provide several pressing units 9 and to distribute them transversely to the pressing direction—possibly, evenly—along the side of the fuel cell stack 2 facing the pressing units 9. The outer wall 7 can, in particular, be connected to the housing lid 4 and the housing bottom (not shown) in a force-transmitting manner.

Of the pressing unit 9, only one pretensioning unit 9a, the length of which can be changed along the pressing direction, is shown in FIG. 1 for the sake of clarity.

The counter-pressing device 5, which can also be connected to the housing lid 4 and the housing bottom in a force-transmitting manner, can have a counter-pressing element 10, which transfers the pressing force applied in the pressing direction P by the pressing units 9 to the housing lid 4 and the housing bottom. The counter-pressing element 10 can be an outer housing wall of the fuel cell device 1 and/or have media supply openings for the fuel cell stack 2. The outer wall 7 of the pressing device 3 can also form a housing outer wall of the fuel cell device 1.

FIG. 2 schematically shows a further exemplary embodiment of the pressing device 3 according to the invention in a perspective view. For elements that correspond in function and/or structure to elements of the exemplary embodiment in FIG. 1, the same reference symbols are used.

The pressing device 3 of the exemplary embodiment of FIG. 2 has two rows of pressing units 9 extending in parallel to each other. These two rows of pressing units 9 are arranged between the outer wall 7 and the contact wall 8. The outer wall 7 respectively has, for each pressing unit 9, one opening 11, which can also be called an access opening. The pretensioning unit 9a and, in particular, an adjusting element 12 of the pretensioning unit 9a are accessible through the opening 11. In the pressing direction P, a supporting element 13 is provided behind each of the adjusting elements 12. At least one spring-elastic element 14, such as a helical or disk spring, can, furthermore, be arranged in parallel to the pressing direction P in front of and/or behind the adjusting element 12 and/or the supporting element 13. In the exemplary embodiment of FIG. 2, the at least one spring-elastic element 14 is provided between the outer wall 7 and the adjusting element 12.

The adjusting element 12 and the supporting element 13 have contact surfaces which extend obliquely to the pressing direction P and in parallel to each other, and which can extend helically around the pressing direction P. The adjusting element 12 can be turnable along an adjusting direction E extending around the pressing direction P so that the contact surfaces of the adjusting element 12 and of the supporting element 13 can slide on top of each other. Since the contact surfaces extend obliquely to the pressing direction P along the adjusting direction E, the distance of the adjusting element 12 to the contact wall 8, on which the supporting element 13 rests, is changed by turning the adjusting element 12. The length of the pretensioning unit 9a thus changes in the pressing direction P or in the opposite direction when turning the adjusting element 12. In the installed state of the pressing device 3, a turning of the adjusting element E in the adjusting direction E or in the opposite direction can thus change a pretensioning of the spring-elastic element 14 so that a spring force acting on the fuel cell stack 2 can be adapted.

FIG. 3 shows the exemplary embodiment of FIG. 2 schematically in a sectional lateral view.

In the sectional lateral view of FIG. 3, the contact surfaces can be seen, wherein the contact surface of the adjusting element 12 points in the pressing direction P and is provided with reference symbol 15. The contact surface of the supporting element 13 pointing in the direction opposite to pressing direction P is provided with reference symbol 16. The contact surfaces 15, 16 extend around the pressing direction P in the adjusting direction E. The contact surfaces 15, 16 extend around the pressing direction P along a helix, the slope of which corresponds to the oblique position of the contact surfaces 15, 16 relative to the pressing direction P.

The adjusting element 12 is accessible through the opening 11. The adjusting element 12 can have an adjusting section 17 designed such that a tool, e.g., a screwdriver or a socket, can be attached to it. The tool can be attached to the adjusting section 17 through the opening 11. By means of the tool, the adjusting element 12 can be easily turned in the adjusting direction E or in the opposite direction, in order to change the pretensioning of the spring-elastic element 14.

By way of example, the spring-elastic element 14 is illustrated as a disk spring stack with a central opening. The spring-elastic element 14 can, however, also be designed differently. Precisely when the central opening is desired, the spring-elastic element 14 can also be designed as a helical spring. The central opening of the spring-elastic element 14 can be arranged such that the adjusting section 17 is arranged therein. The adjusting element 12 can furthermore have a holding element 18, which prevents a sliding or tilting of the adjusting element 12 transverse to the pressing direction P. The holding element 18 can in this case extend in parallel to the pressing direction P and, in doing so, abut the spring-elastic element 14. The holding element 18 is, for example, designed as a collar with a circular cross-section transverse to the pressing direction P, wherein a central longitudinal axis of this collar extends in parallel to the pressing direction P. The holding element 18 can protrude into the spring-elastic element 14 and, in particular, into its central opening. If the spring-elastic element 14, however, does not have such a central opening, or if the holding element 18 is not to be arranged in the central opening for other reasons—for example, for reasons of space—the holding element 18, which can optionally be designed again as a collar, can also receive the spring-elastic element 14 at least partially and extend around it in the adjusting direction E. This exemplary embodiment is provided in FIG. 3 with reference symbol 18a. It is also possible for the adjusting element to have both holding elements 18 and 18a. The at least one holding element 18, 18a can abut a surface of the spring-elastic element 14, wherein this surface forms a counter-holding element.

If the spring-elastic element 14 has a circular-cylindrical basic shape or a circular-cylindrical central opening, and if the holding element 18 and/or 18a is designed as a collar with a circular-cylindrical cross-section, the spring-elastic element 14 and the holding element 18 and/or 18a can prevent, not only a sliding or tilting of the individual [sic] element 12, but also a turning of the adjusting element 12. The spring-elastic element 14 can thus be designed as a pivot bearing for the adjusting element 12.

Between the adjusting element 12 and the contact wall 8, a cavity 19 can be formed, which can be delimited by the adjusting element 12 and the contact wall 8 in parallel to the pressing direction P, and by the adjusting element 12 and the supporting element 13 transversely to the pressing direction P. This cavity 19 makes it possible for the pressing device 3 to be formed with a weight as low as possible.

Optionally provided in the cavity 19 can be an internal guiding element 20, which guides the relative movement of the adjusting element 12 in relation to the supporting element 13 and/or the translation resulting from the turning of the adjusting element 12 along the pressing direction P. The guiding element 20 can internally abut inner surfaces of the adjusting element 12 and the supporting element 13 extending in parallel to the pressing direction P. The guiding element 20 is, for example, formed cylindrically or annularly and has, for example, a circular cross-section.

Alternatively or additionally provided can be an external guiding element 21, which guides the relative movement of the adjusting element 12 to the supporting element 13 and/or the translation resulting from the turning of the adjusting element 12 along the pressing direction P. The guiding element 21 can externally abut outer surfaces of the adjusting element 12 and the supporting element 13 extending in parallel to the pressing direction P. The guiding element 20 is, for example, designed to be toroidal or annular.

If the guiding element 20, 21 is designed to be toroidal or annular, its central longitudinal axis can extend in parallel to the pressing direction P.

FIG. 4 schematically shows a further exemplary embodiment of the pressing device 3 according to the invention in a perspective view, wherein the adjusting element 12 is shown partially cut away. For elements that correspond in function and/or structure to elements of the previous exemplary embodiments, the same reference symbols are used. For brevity's sake, only the differences from the previous exemplary embodiments are discussed below.

The contact surface 16 of the supporting element 13 is provided with locking elements 22, as can be seen in FIG. 4. The locking elements 22 can be stepped, trapezoidal, or sawtooth-shaped, or even otherwise formed. The contact surface 15 of the adjusting element 12 can be designed with counter-locking elements formed to be complementary to the locking elements 22. The locking elements 22 and the counter-locking elements prevent an undesired turning of the adjusting element 12 around the pressing direction P, i.e., in the adjusting direction E or in the opposite direction. This can ensure that a pretensioning of the spring-elastic element 14, once adjusted, is not changed readily.

LIST OF REFERENCE SYMBOLS

1 Fuel cell device
2 Fuel cell stack
3 Pressing device
4 Housing lid
5 Counter-pressing device
6 Shape-retaining element
7 Outer wall
8 Contact wall
9 Pressing unit
9a Pretensioning unit
10 Counter-pressing element
11 Opening
12 Adjusting element
13 Supporting element
14 Spring-elastic element
15 Contact surface of the adjusting element
16 Contact surface of the supporting element
17 Adjusting section
18, 18a Holding element
19 Cavity
20 Internal guiding element
21 External guiding element
22 Locking element
E Adjusting direction
P Pressing direction

The invention claimed is:

1. A system, comprising:
a pressing device that, in use, presses a fuel cell stack in a pressing direction, the pressing device including:
a first spring-elastic pressing unit that, in use, applies a first spring force acting along a first pressing axis aligned with the pressing direction;
a second spring-elastic pressing unit that, in use, applies a second spring force acting along a second pressing axis aligned with the pressing direction;
a first pretensioning unit with which a pretensioning of the first pressing unit can be changed, the first pretensioning unit having a first adjusting element and a first supporting element, wherein the first adjusting element can be turned relative to the first supporting element in a first adjusting direction extending around the first pressing axis and wherein the first adjusting element and the first supporting element have respective contact surfaces that contact each other, extend in parallel to each other, and extend obliquely to the pressing direction; and
a second pretensioning unit with which a pretensioning of the second pressing unit can be changed independently of the pretensioning of the first pressing unit, the second pretensioning unit having a second adjusting element and a second supporting element, wherein the second adjusting element can be turned relative to the second supporting element in a second adjusting direction extending around the second pressing axis and wherein the second adjusting element and the second supporting element have respective contact surfaces that contact each other, extend in parallel to each other, and extend obliquely to the pressing direction.

2. The system according to claim 1, wherein the contact surfaces of the first adjusting element and the first supporting element monotonously rise or fall, at least in sections, in the first adjusting direction.

3. The system according to claim 1, wherein the contact surfaces of the first adjusting element and the first supporting element are formed, at least in sections, along a helix extending around the first pressing axis.

4. The system according to claim 1, wherein the contact surface of the first supporting element has at least one locking element, and the contact surface of the first adjusting element has at least one counter-locking element for the locking element, wherein the locking element and the counter-locking element block a movement of the first adjusting element in the first adjusting direction or in the opposite direction.

5. The system according to claim 1, wherein the first adjusting element and the first supporting element respectively have at least two contact surfaces substantially complementary to each other.

6. The system according to claim 1, wherein the pressing device has a contact wall for transferring a pressing force generated by the pressing device to the fuel cell stack, and an outer wall, wherein the first adjusting element is arranged between the contact wall and the outer wall and wherein the outer wall has at least one opening through which the first adjusting element is accessible.

7. The system according to claim 6, wherein the first adjusting element or the first supporting element is attached to the contact wall.

8. The system according to claim 1, wherein the first spring-elastic pressing unit includes a pivot bearing for the first adjusting element.

9. The system according to claim 1, wherein the first spring-elastic pressing unit includes a guiding element that abuts the first adjusting element and the first supporting element.

10. A fuel cell device, comprising:
a fuel cell stack; and
a pressing device that, in operation, presses the fuel cell stack in a pressing direction, the pressing device including:
a contact wall that, in operation, transfers a pressing force generated by the pressing device to the fuel cell stack, wherein the contact wall has a helically-sloped surface;
an outer wall;
a spring-elastic pressing unit that, in operation, applies a spring force acting in the pressing direction; and
at least one pretensioning unit with which a pretensioning of the pressing unit can be changed, the pretensioning unit having an adjusting element having a helically-sloped surface engaged with the helically-sloped surface of the contact wall, wherein the adjusting element can be turned relative to the contact wall in an adjusting direction extending around the pressing direction, and
wherein the contact wall is located between the fuel cell stack and the adjusting element, and the adjusting element is located between the contact wall and the outer wall.

* * * * *